(12) United States Patent
Anderson et al.

(10) Patent No.: US 9,058,836 B2
(45) Date of Patent: Jun. 16, 2015

(54) DATA TRANSFER APPARATUS

(75) Inventors: Jim Anderson, Eagle, ID (US); Jeff McAllister, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1240 days.

(21) Appl. No.: 12/362,432

(22) Filed: Jan. 29, 2009

(65) Prior Publication Data
US 2010/0188770 A1    Jul. 29, 2010

(51) Int. Cl.
*G11B 15/46*    (2006.01)
*G11B 15/43*    (2006.01)
*G11B 15/62*    (2006.01)

(52) U.S. Cl.
CPC ............... *G11B 15/43* (2013.01); *G11B 15/62* (2013.01)

(58) Field of Classification Search
USPC ..................... 360/77.12, 75, 69, 55
See application file for complete search history.

(56) References Cited

U.S. PATENT DOCUMENTS

| | | | |
|---|---|---|---|
| 3,564,158 A | | 2/1971 | Horton |
| 3,939,493 A | | 2/1976 | Fowler et al. |
| 3,942,698 A | | 3/1976 | Hattori et al. |
| 4,011,588 A | | 3/1977 | Yasuda et al. |
| 4,479,158 A | | 10/1984 | Froehlich et al. |
| 4,665,824 A | * | 5/1987 | Greiner et al. ................. 101/492 |
| 5,930,089 A | | 7/1999 | Anderson |
| 6,166,881 A | | 12/2000 | Anderson et al. |
| 6,215,618 B1 | | 4/2001 | Anderson et al. |
| 6,587,305 B2 | * | 7/2003 | Saliba ........................... 360/129 |
| 6,751,056 B1 | | 6/2004 | Anderson et al. |
| 6,856,488 B2 | * | 2/2005 | King et al. .................... 360/251 |
| 6,977,668 B2 | * | 12/2005 | Sautter .......................... 347/197 |

* cited by examiner

*Primary Examiner* — Fred Tzeng
(74) *Attorney, Agent, or Firm* — Hewlett-Packard Patent Development

(57) ABSTRACT

A data transfer apparatus comprises drive apparatus to move a received tape along a path in a longitudinal direction of the tape, a transducer head to transfer data to and/or from the tape, a tape lifter to contact the tape; and control apparatus operable, in response to a tape speed related condition or event, to cause relative movement between the tape lifter and the tape into mutual contact, thereby biasing the tape away from surface to surface contact with the transducer head.

20 Claims, 8 Drawing Sheets

DATA TRANSFER APPARATUS

BACKGROUND

Data can be recorded on, and read from, a moving tape with a transducer (read and/or write) head which is positioned next to the tape. The tape is typically made up of a thin plastic base material with a coating of particles that that can be magnetized by a nearby magnetic field which aligns the magnetic domains of the particles. Once the field is removed, the particles remain aligned. For example, these particles may include ferric oxide, chromium oxide, metal films, and other suitable materials. Additionally, a number of coatings or additives can be added to the tape. By way of example and not limitation, the tape may include a binder matrix to attach the particles to the plastic base and lubricant to reduce friction and wear as the tape moves across surfaces of the transducer head.

The transducer head may have a single transducer (read and/or write) element or, as is more common, a series of transducer elements arranged within the head. Data is recorded in tracks on the tape by moving the tape, in a direction of a longitudinal axis of the tape, past the head. The transducer elements are typically very small electromagnets which are selectively activated by electrical signals which represent the data to be recorded on the tape. These electrical signals are transformed by the transducer elements into a concentrated magnetic field which aligns the magnetic domains of particles attached to the presently adjacent portion of tape. These particles remain magnetized with aligned magnetic domains, allowing the data written to the tape to be retrieved.

After the data is written to the tape, the data can be retrieved from the tape by again passing the tape over the head. The magnetic fields retained by the particles generate electrical impulses within the nearby transducer elements. These electrical impulses are filtered and amplified to produce a representation of the stored data.

As recording density increases in tape data transfer devices, surfaces of the tape and transducer heads have been made smoother to increase head/tape contact during data transfer (read and/or write) operations. The smoother surfaces can result in higher stiction forces. When the tape is well used, it tends to become even smoother, and its lubrication layer can be compromised, potentially further contributing to stiction.

BRIEF DESCRIPTION OF THE DRAWINGS

In order that the invention may be well understood, various embodiments thereof will now be described, by way of example only, with reference to the accompanying drawings, in which.

Throughout the drawings, identical reference numbers designate similar, but not necessarily identical, elements.

DETAILED DESCRIPTION

Figure 1:
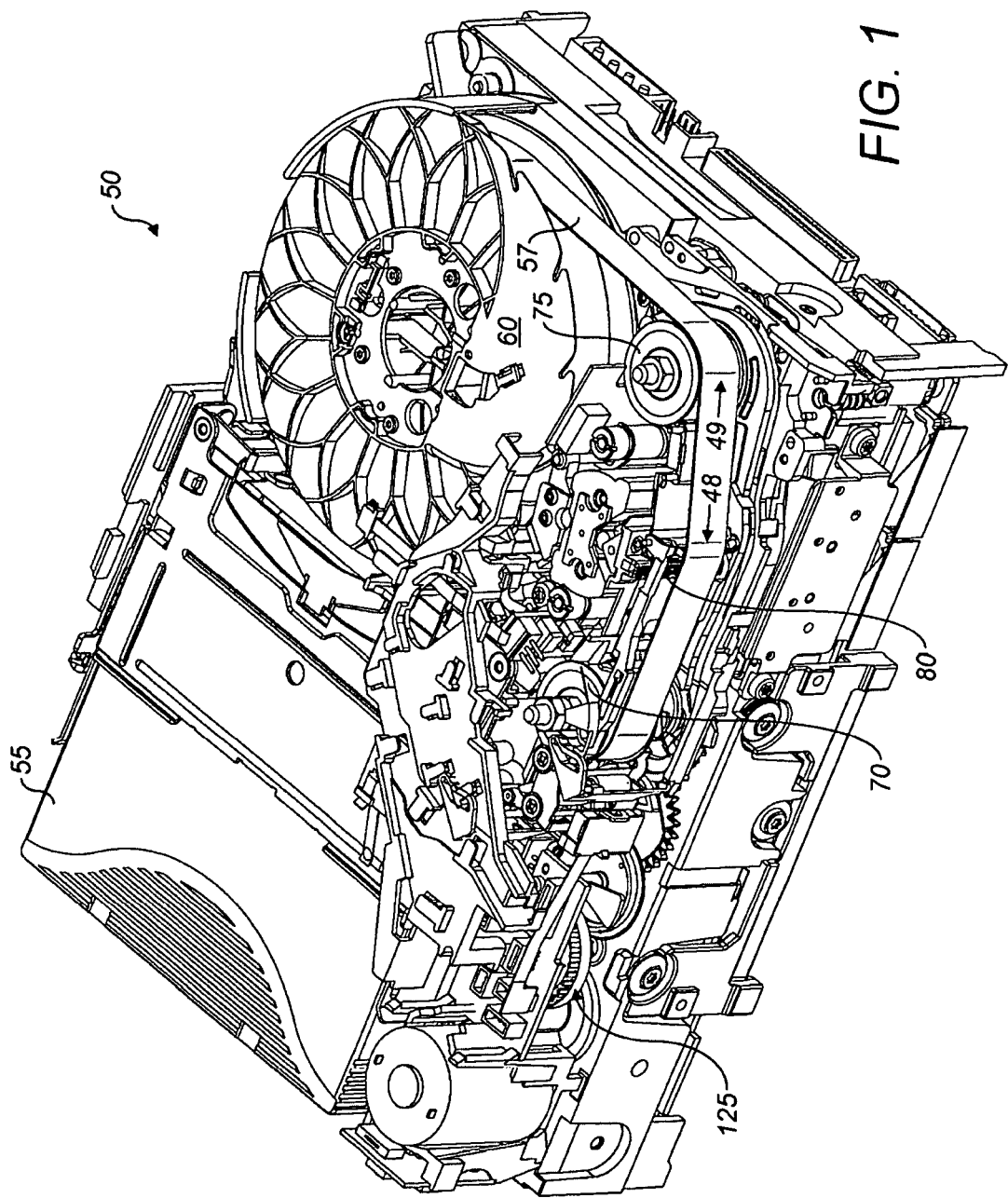
FIG. 1 is a perspective view from the top, rear and one side, showing portions of an exemplary tape drive.
Figure 2:
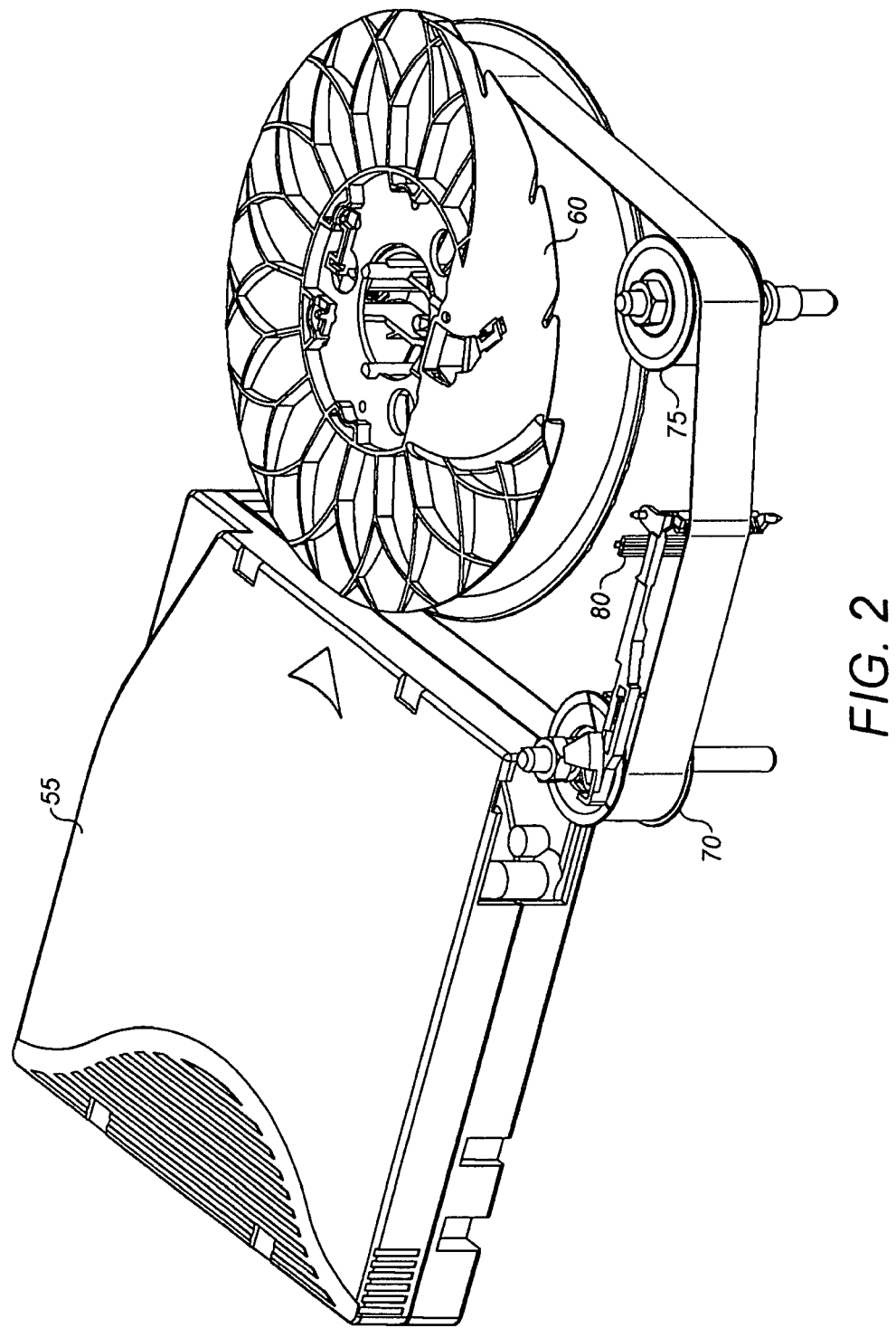
FIG. 2 is a view similar to FIG. 1, with certain features removed to better illustrate relative dispositions of a tape lifter, a transducer head, and a tape received in the tape drive.
Figure 5:
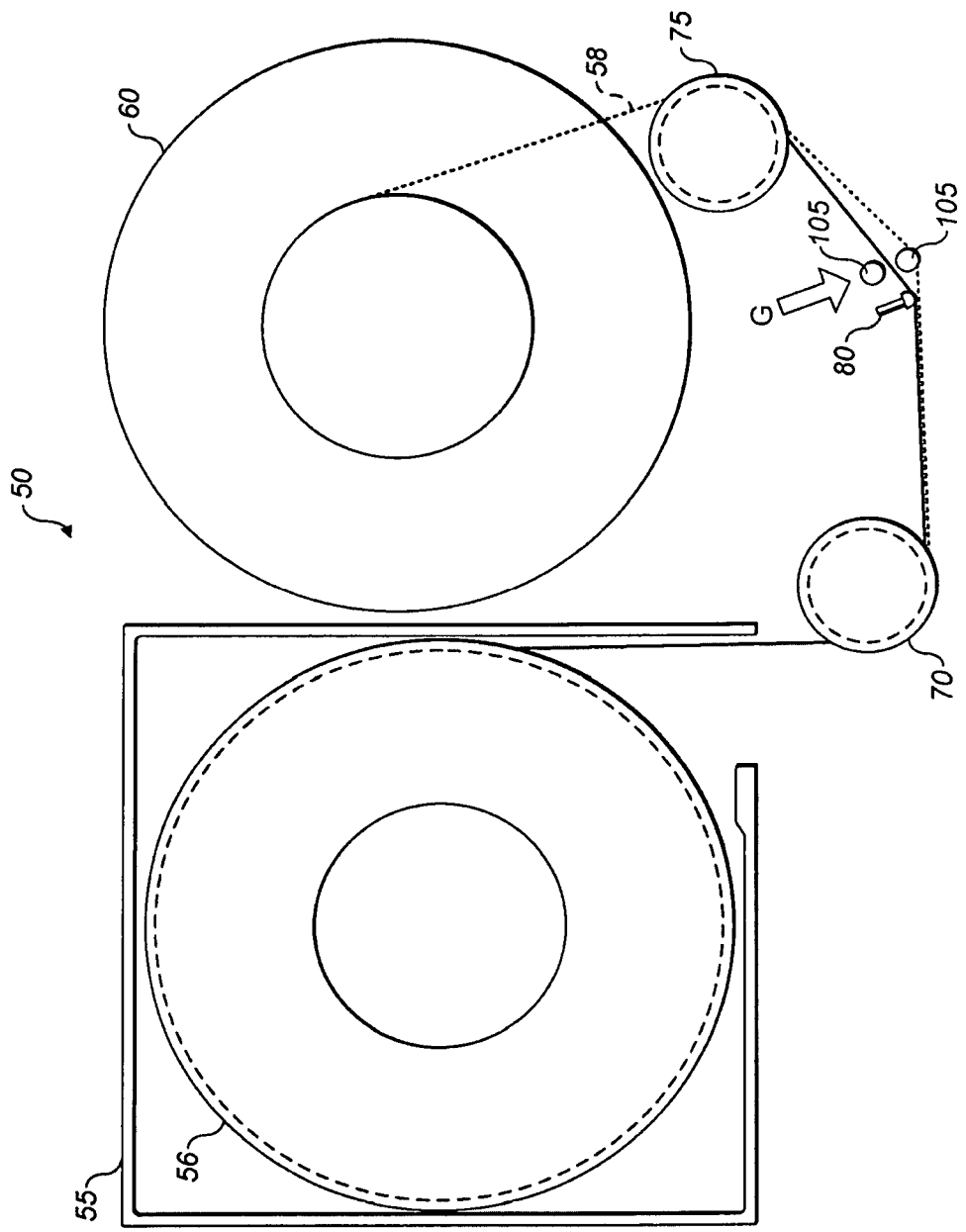
FIG. 5 is a plan view schematically illustrating selected features of the tape drive, illustrating movement of the tape lifter and the tape away from the transducer head.

Referring to FIGS. 1 to 7, data transfer apparatus is shown in the form of a tape drive 50. A single reel data tape cartridge 55, comprising a cartridge reel 56 (FIG. 5) and a tape 57, is received in the tape drive 50. The tape 57 is shown in FIGS. 1, 2 and 5 in a deployed disposition, with a leading end portion of the tape taken up on a take-up reel 60 of the drive 50. The tape drive 50 includes two guide rollers 70, 75 for guiding the tape 57 along a tape path 58.

Drive apparatus is provided in the form of a cartridge reel motor 59 (FIG. 7) and a take-up reel motor 61 (FIG. 7) for respectively driving the cartridge and take-up reels 56 and 60. The cartridge and reel motors 59, 61 can be controlled by control apparatus 90 (FIG. 7) to move the tape 57 in a desired direction of a longitudinal axis of the tape 57, as indicated by arrows 48 and 49 in FIG. 1.

Figure 7:
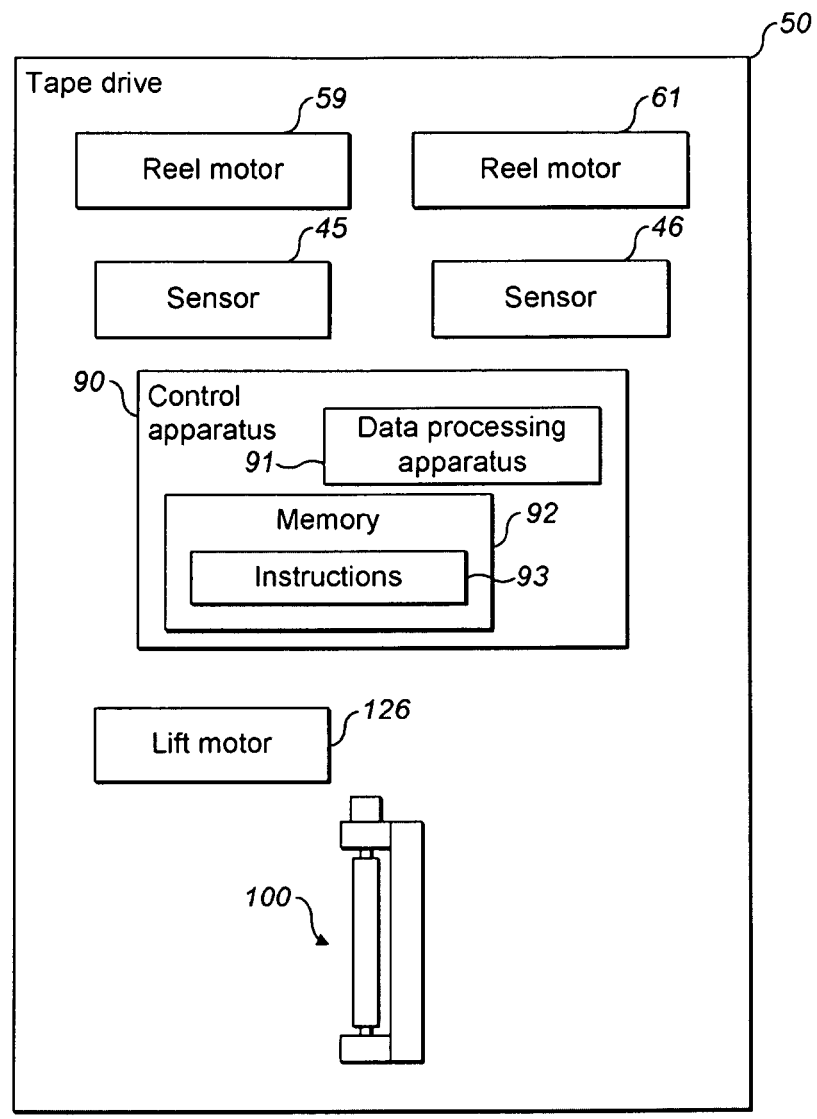
FIG. 7 is a higher level functional block diagram showing selected aspects of the tape drive of FIG. 1, including an exemplary control apparatus for controlling the tape lifter.

As illustrated in FIG. 7 and described in further detail below, the control apparatus 90 comprises data processing apparatus 91 including at least one processor, and a processor-readable medium in the form of memory apparatus 92. The memory apparatus 92 comprises at least one non-volatile memory, for example in the form of an EEPROM, containing processor-readable program instructions 93 for processing by the processing apparatus 91. The instructions 93, when executed by the processing apparatus 91, cause the processing apparatus 91 to perform various functions required of the control apparatus 90, some of which are described in further detail below. Any convenient form or combination of volatile and/or non-volatile memories can be employed to contain the instructions 93.

The tape drive 50 further includes a cartridge reel sensor 45 and a take-up reel sensor 46 (FIG. 7). Signals from the sensors 45, 46 can be used by the control apparatus 90 to obtain an indication of the speed of rotation of the cartridge and take-up reels 56, 60. In the present embodiment, for example, the reel motors 59, 61 have sensors 45, 46 in the form of respective integral Hall effect sensors that sense motor rotation. A Hall effect sensor is a transducer which varies its voltage output in response to changes in magnetic field. These changes in magnetic field can be generated by solid-state magnets integrated into the reel drive motors 59, 61. Alternatively, the Hall effect sensors could sense the commutation of coils within the reel drive motors, or another convenient form of sensor could be provided. Using the output of sensors 45, 46, the control apparatus 90 can determine and control tape speed.

A transducer head 80 is located on the tape path 58 between the guide rollers 70, 75. The transducer head 80 comprises first and second mutually spaced parallel arrays of transducer elements, the transducer elements being spaced along the longitudinal (vertically disposed in the orientation shown in FIGS. 1 and 2) axis of the transducer head 80, for transferring data to and from respective parallel data tracks (not shown) aligned along a direction of the longitudinal axis of the tape 57. The transducer head 80 is connected to a read channel for converting transduced signals into digital data for processing by the drive, and to a write channel for supplying digital data for transducing onto tape.

The transducer head 80 also comprises further transducer elements for reading servo data from servo tracks (not shown) on the tape 57. The transducer head 80 is further connected to a servo system to process servo data to provide the control apparatus 90 with tape position and speed data, for finer granularity of tape speed control, in a known manner.

As best seen in FIGS. 1, 2 and 5, the guide rollers 70, 75 and the transducer head 80 are relatively disposed such that tape 57 moving along the portion of the tape path between the rollers 70, 75 directly in front of the head 80, is biased into contact with the transducer head 80 under the tension exerted on the tape 57 by the drive reels 56, 60, causing surface to surface contact between the transducer head 80 and the tape 57 in the contact region of the transducer head 80 and the tape path 58 during data transfer.

Adjacent the tape path 58, at a location spaced along the tape path from the contact region of the transducer head 80 and the tape path 58 in the direction of the take-up reel 60, there is provided a tape lifter 100. The tape lifter 100 comprises a rolling contact member 105 that extends laterally of the contact surface of the tape 57 along a substantially upright axis A-A, and is rotatable about the axis A-A for rolling contact with tape 57 moving along the tape path 58. The tape lifter 100 further comprises a support 107 mounted for rotation relative to the tape drive chassis about an axis B-B. The support 107 further comprises support arm portions 108, 109 that support the contact member 105 for rotation about axis A-A. The support 107 further comprises an actuator portion 110 that is offset from the axis B-B by virtue of being mounted to the support 107 by a lever portion 111.

The tape drive 50 also comprises an actuator arm 115 engaged at one end portion thereof (the right-hand end portion in the orientation of FIG. 3) with the actuator portion 110 of the tape lifter support 107, and engagable at an opposite end portion thereof (the left-hand end portion in the orientation of FIG. 3) with a lug 120 fixed for rotation with a driven member 121. The driven member 121 is connected to a drive train 125, best shown in FIG. 4, for being rotatably driven about an axis H-H. The drive train 125 comprises an electrical motor, shown as lift motor 126, controllable by the control apparatus 90, to drive a gear train 127 including gear members 128, 129, 130, 131, 132, 133.

Figure 3:
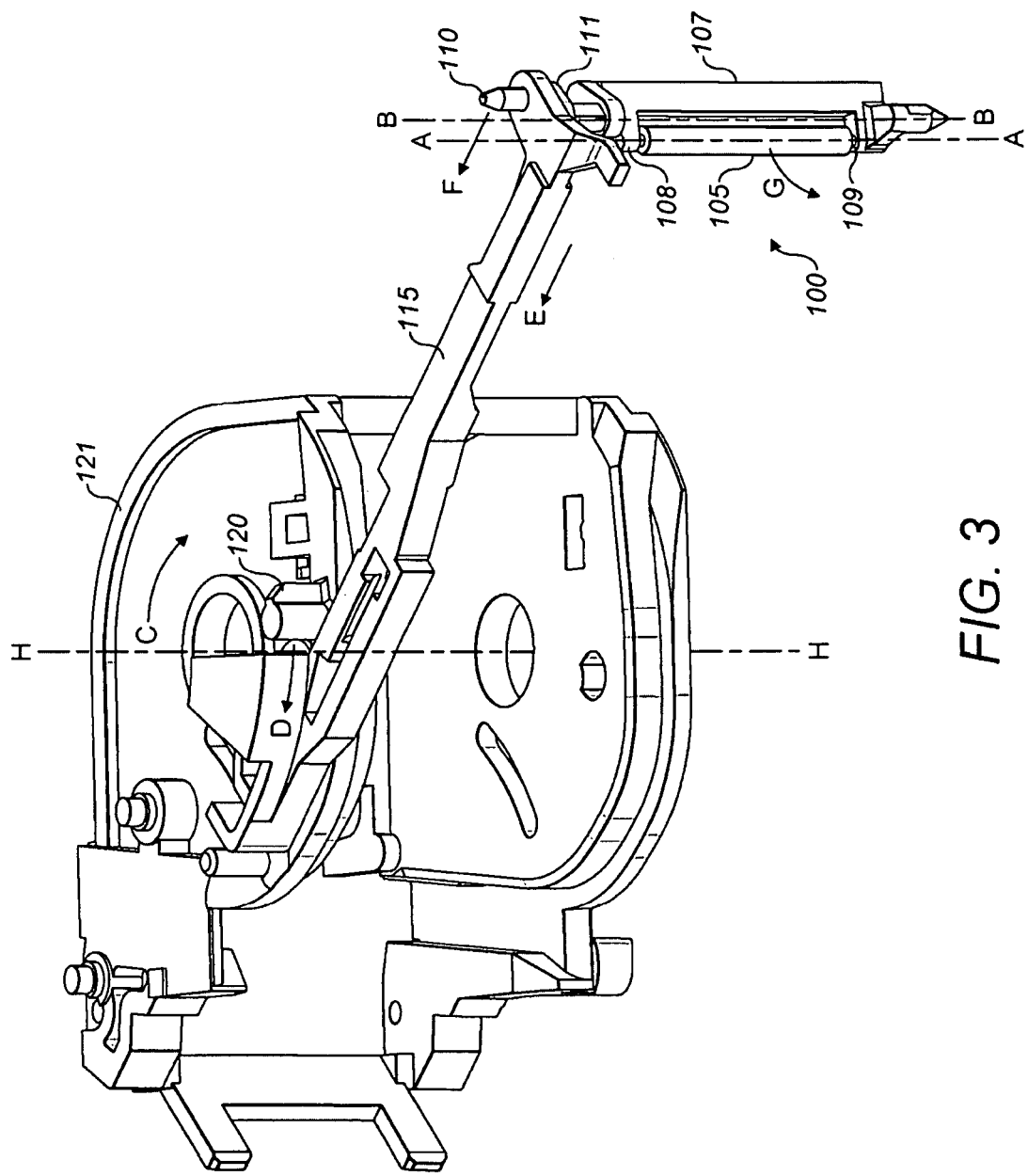
FIG. 3 shows an actuator mechanism, for actuating the tape lifter, in greater detail.
Figure 4:
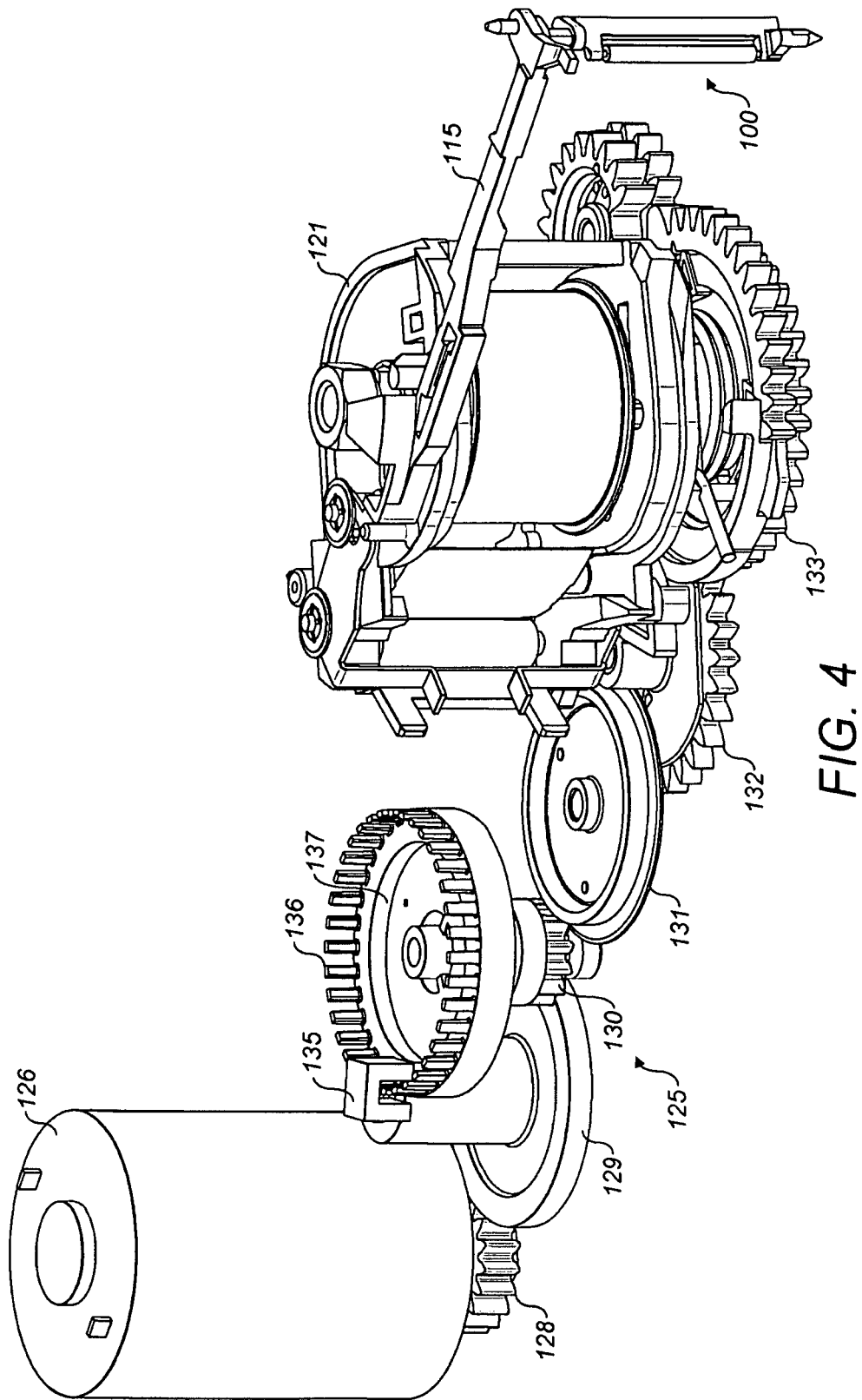
FIG. 4 shows a drive train for the actuator mechanism in greater detail.

With reference to FIG. 3, rotation of gear member 133 in the direction of arrow C causes rotation of the driven member 121, thereby causing the lug 120 to move in the general direction of arrow D and into contact with a surface (not shown) of the left-hand end portion of the actuator arm 115. Continued rotation of the driven member 121 causes displacement of the actuator arm 115 in a direction generally along a longitudinal axis of the actuator arm 115 indicated by arrow E. Displacement of the actuator arm 115 causes the actuator portion 110 of the lifter support 107 to follow in a direction indicated generally by arrow F, causing the tape lifter 100 to pivot about the axis B-B. Pivoting of the tape lifter 100 about the axis B-B causes the rolling contact member 105 to move generally in a direction towards the tape path 58.

Conveniently, actuation of the tape lifter 100 employs components that have other functions in the tape drive 50, to minimise additional cost and footprint of the tape lifter at 100 and its actuation mechanism. For example, drive train 125 has primary functions including loading a tape cartridge 55 into the tape drive 50, and actuating a tape threading mechanism. To effect a threading of a tape 57, driven member 121 guides a receptacle block to receive a pin attached to a front end of the tape 57 in cartridge 55, the receptacle block being disposed at one end of a leader tape, an opposite end of the leader tape being attached to the take-up reel 60. During winding through of the leader tape and receptacle block by the take-up reel 60, it is known to actuate a prior art tape lifter, bringing a cam surface of the prior art tape lifter into contact with the tape 57, to hold the leader tape and receptacle block away from the transducer head 80. Lifting the tape 57 away from the transducer head 80 during threading of the tape 57 prevents unnecessary wear and contamination of the transducer head 80. After the tape 57 is threaded and positioned, the prior art tape lifter retracts, allowing the tape 57 to contact the transducer head 80. It will be noted that these primary functions are not performed during data transfer operations.

Figure 6:
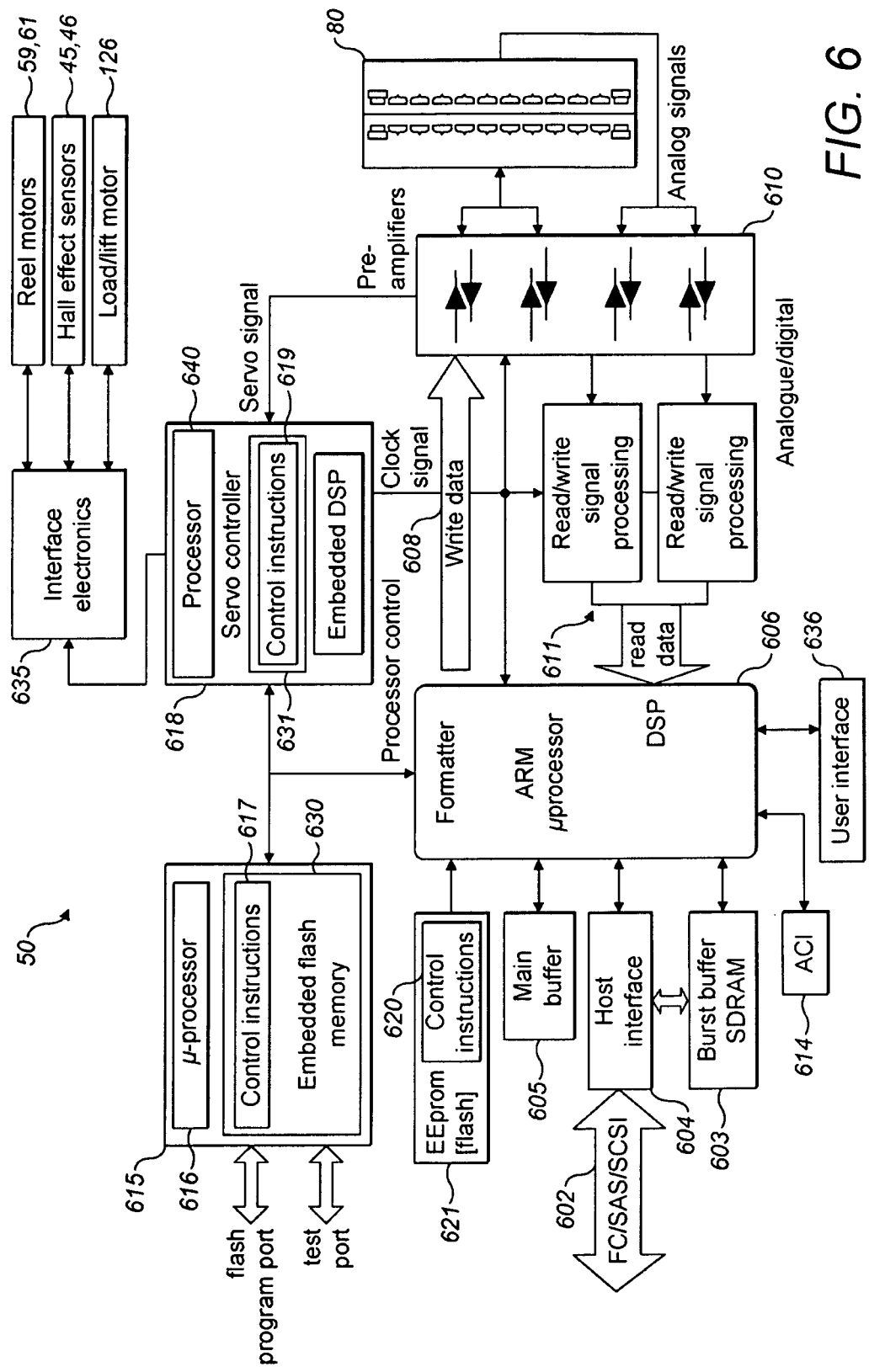
FIG. 6 is a functional block diagram showing an exemplary arrangement for controlling various functions of the tape drive.

FIG. 6 is a functional block diagram, showing an exemplary arrangement for controlling various functions of the tape drive 50, including more detail of how the control apparatus 90 may be constituted. A host interface 604 is provided for connecting the tape drive 50 to a host computer (not shown) using, for example, Fiber Channel (FC), Serial Attached SCSI (SAS), SCSI, or any other suitable protocol 602. Data received from one or more host computers through the interface 604 is processed and formatted by a formatter 606 into suitably formatted code words that are transferred through an internal communications medium 608 to a bank of pre-amplifiers 610 that provide analog signals to the transducer elements of the transducer head 80. The formatter 606 comprises a processor. Program instructions 620 for controlling the formatter 606 processor can be provided in a memory 621. The formatter 606 also has digital signal processing capability. Analog signals read by transducer elements from the tape are passed back through the pre-amplifiers 610, converted into digital signals using processing capability 611, and re-formatted by the formatter 606 for transmission through the interface 604 to a host computer. Buffers 603 and 605 are provided to facilitate management of data flows by the host interface 604 and formatter 606 respectively. An automation control interface 614 can be provided to enable operation of the drive in a tape library.

A system controller 615 (forming part of the control apparatus 90 of FIG. 7) provides overall control of various functions of the tape drive 50, including functions provided by the host interface 604, the formatter 606 and a servo controller 618. System controller 615 includes control program instructions 617 (forming part of program instructions 93) stored in non-volatile memory 630 (forming part of memory apparatus 92) supplying instructions to a system processor 616 (forming part of processing apparatus 91).

The control apparatus 90 also includes the servo controller 618, which comprises a processor 640 (forming part of processing apparatus 91) supplied with program instructions 619 (forming part of program instructions 93) stored in non-volatile memory 631 (forming part of memory apparatus 92), for example EEPROM flash memory. The servo controller 618 receives and processes servo signals through the pre-amplifiers 610 from servo transducer elements on the transducer head 80, for control of head 80 lateral position and finer grain control of tape speed, when the transducer head 80 is in contact with a tape 57. The servo controller 618 under control of the program instructions 619, and using suitable interfaces 635, can also deterministically control tape drive functions such as transducer head 80 lateral positioning, reel motor 59, 61 speed, cartridge 55 loading and unloading, and tape lifter actuation.

Figure 8:
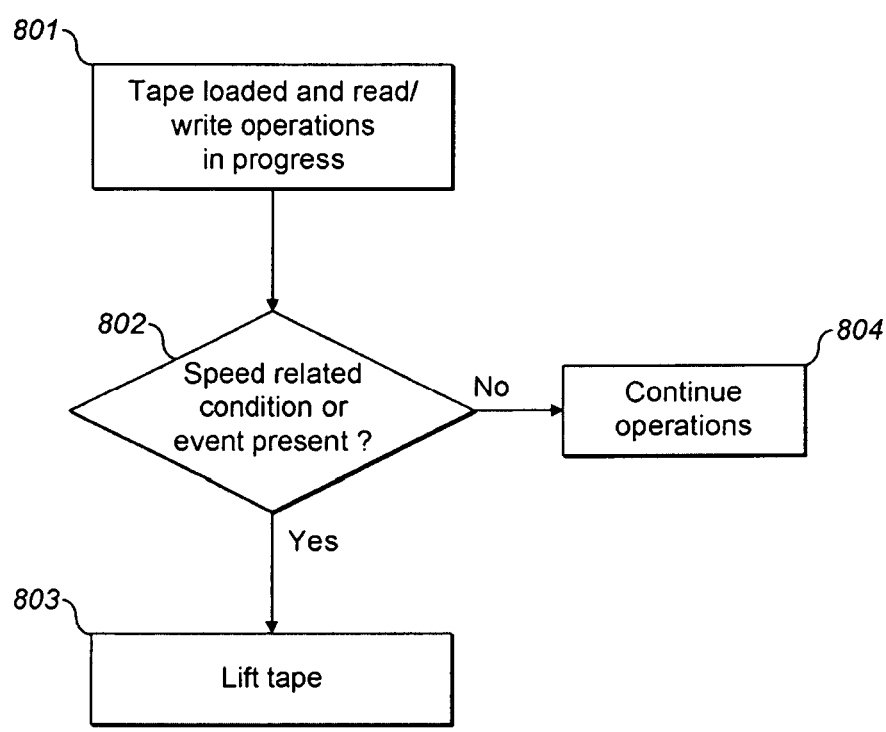
FIG. 8 is a flow diagram illustrating a method of lifting the tape.

Operation of the tape lifter 100 will now be described. With reference to FIG. 8, during data transfer operations 801, for example with the tape drive 50 connected to a host computer, for storing data to tape from, or retrieving data from the tape for, the host computer, the tape 57 is lifted 803 relative to the transducer head 80 dependent on whether a tape speed related condition or event is present 802. If the speed related condition or event is not present, operations continue normally, step 804.

In the present embodiment, program instructions 617 (FIG. 6) cause the system controller 615 to process data from the sensors 45, 46 and repeatedly make a determination, taking into account the instant tape pack size on each reel 56, 60, whether tape speed has dropped below a predetermined speed threshold. In one embodiment, a minimum desirable operating speed of the tape drive 50 is 2 m/s, and it is desirable to mitigate or prevent surface to surface contact between the tape 57 and the transducer head 80 at tape speeds below about 0.25 m/s, and to effect surface to surface contact between the tape 57 and the transducer head 80 at tape speeds above about 0.75 m/s. Thus, the upper predetermined speed is set to 0.75 m/s. If the system controller 615 determines that tape speed is dropping and has moved below 0.75 m/s, the system control program instructions 617 cause the system controller 615 to instruct the servo controller 618 to control the lift motor 126 to initiate movement of the rolling contact member 105 of the tape lifter 100 towards the tape 57. This approach allows latency of 0.5 ms to complete movement of the tape lifter 100 into its actuated position. If no such determination is made, normal data transfer operations continue without interruption.

With the tape lifter in an actuated condition, program instructions 93 are executed by the processing apparatus 91 to cause the control apparatus 90 to process data from the sensors 45, 46 and repeatedly make a determination, whether tape speed has increased above a predetermined speed threshold. In one embodiment, the lower predetermined speed is 0.25 m/s. If the control apparatus 90 determines that tape speed is increasing and has moved above 0.25 m/s, the program instructions 93 cause the control apparatus 90 to control the lift motor 126 to move the tape lifter 100 back to its unactuated position and away from the tape 57 within the 0.5 m/s latency period. If no such determination is made, the tape lifter 100 remains in the actuated position.

In alternative embodiments, program instructions 617 do not cause the system controller 615 to make a speed determination. Instead, relative movement of the lifter 100 and tape 57 is initiated responsive to an alternative tape speed related event or condition. For example, a relevant event or condition could be associated with reaching an end of wrap, a detection of a bad write or a read error, or when there is insufficient host data to maintain a minimum tape speed necessary for data transfer operations, or any other condition or event related to tape speed, that indicates tape speed is decreasing to zero. The system controller 615, in response to receiving information that such a condition is present or event has occurred, or in response to the generation of operational instructions related to such an event or condition, instructs the servo controller 618 to control the lift motor 126 to initiate movement of the rolling contact member 105 of the tape lifter 100 towards the tape 57.

In further alternative embodiments, control of tape lift may be effected directly by a mechanical lift control mechanism (not shown) that is directly linked to a tape speed responsive mechanical component, such as a rotating part of a reel motor 59, 61, such that as tape speed drops towards zero, the tape speed responsive component acting directly on the lift control mechanism causes the transducer head 80 and tape 57 to move out of contact in response to a predetermined speed condition or event.

In the present embodiment, in response to initiation of the tape lifter 100, the rolling contact member 105 moves in a direction having a component directed substantially orthogonally of the tape path 58, biasing the tape 57 away from surface to surface contact with the transducer head 80. In one embodiment, the control apparatus 90 receives information from a rotation detect sensor 135, and drives the lift motor 126 until the rotation detect sensor 135 has detected movement past the sensor 135 of a predetermined number of teeth 136 of a rotation detect member 137 drivingly coupled to the gear train 128 to 133. As illustrated in FIG. 5, in which the amount of deviation of the tape path from a straight line between the guides 70 and 75 is much exaggerated, the motor 126 is controlled to move the contact member 105 with an orthogonal component of movement generally in the direction of arrow G, thereby lifting the tape 57 from the direction of one side of the contact region. The predetermined number of teeth 136 is selected to cause the motor 126 to drive the tape lifter 100 until the tape 57 is out of surface to surface contact with the transducer head 80.

In alternative embodiments, contact between the tape 57 and transducer head 80 may only be reduced, and not completely eliminated. For example, the tape 57 may be lifted across a sub-region of the region of contact between the tape 57 and transducer head 80, such as a region on one side of the transducer head 80. In other embodiments, instead of the rotation detect sensor 135 and member 137, an alternative approach is used to effect the desired range of movement of the contact member 105. For example, the motor 126 could be driven for a predetermined time, and/or a position sensor could be used to identify an instant position of the contact member 105.

The tape drive 50 operating as described in the immediately preceding paragraphs facilitates the mitigation or elimination of contact between the transducer head 80 and a tape 57 in response to tape speed dropping below a normal speed for data transfer operations and approaching zero. This facilitates the mitigation or elimination of adverse stiction events during low or zero tape speed events that routinely occur during data transfer operations, for example tape direction changes due to end of wrap, detection of a bad write, or a read error, or when there is insufficient host data to maintain a minimum necessary tape speed.

The tape lifter geometries and actuation described above are only illustrative embodiments of a tape lifter. In alternative embodiments, the tape lifter may have a variety of geometries, actuation, and methods for lifting the tape. For example, the tape lifter may contact the tape in two locations, one on either side of the head. In an alternative embodiment, the tape lifter may not move towards the tape 57, but be brought into contact with the tape 57 when the transducer head 80 is retracted, by virtue of movement of the transducer head 80 away from the tape path 58. In this manner, by retracting the head 80, the tape 57 is supported by the tape lifter and the surface of the transducer head 80 is disengaged from the tape 57. The tape lifter may be made from a variety of materials, including metal, plastic, composite, glass, or a combination of suitable materials. In further alternative embodiments, the contact member 105 of the tape lifter 100 may be fixed relative to the lifter support 107, and not provide rolling contact.

The functions of the control apparatus 90, in the present embodiment, are provided primarily by the system controller 616 and the servo controller 618. However, any other convenient arrangement and/or combination of processing resources and program instructions could alternatively be employed to provide the control apparatus 90.

The term processing apparatus can include microprocessors, microcontrollers, processor modules or subsystems (including one or more microprocessors or microcontrollers), or other control or computing devices. A "processor" can refer to a single component or to plural components. The term processor-readable medium can include one memory or a combination of memories. The memories can use any convenient technology, for example non-volatile memory technology including erasable and programmable read-only memories (EPROMs), electrically erasable and programmable read-only memories (EEPROMs) and flash memories. Alternative possibilities include semiconductor memory devices such as dynamic or static random access memories (DRAMs or SRAMs), and also magnetic disks and other magnetic and/or optical media.

In alternative embodiments the tape drive 50 could receive a two-reel cartridge and/or be provided with rotating heads. Furthermore, alternative tape speed control apparatus could be provided. For example, tape speed control could be effected by a capstan disposed along the tape path, with the reel motors providing appropriate tape tension, and/or no servo arrangement may be provided.

In the preceding description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. Data transfer apparatus comprising:
    drive apparatus to move a received tape along a path in a longitudinal direction of the tape;
    a transducer head to transfer data to and/or from the tape;
    a tape lifter to contact the tape; and
    control apparatus operable, in response to a tape speed related condition or event, to cause relative movement between the tape lifter and the tape into mutual contact such that the tape lifter moves the tape, thereby biasing the tape away from surface to surface contact with the transducer head.

2. The data transfer apparatus of claim 1, wherein the relative movement between the tape lifter and the tape lifts the tape out of any surface to surface contact with the transducer head.

3. The data transfer apparatus of claim 1, wherein the tape lifter contacts the tape at a location on the tape path that is spaced along the tape path from a contact region of the transducer head and tape path, thereby lifting the tape from one side of the contact region.

4. The data transfer apparatus of claim 3, wherein the out of contact portion of the tape path comprises a sub-region of the contact region.

5. The data transfer apparatus of claim 1, wherein the tape lifter comprises at least one rolling contact member, for rolling contact with the tape moving along the tape path.

6. The data transfer apparatus of claim 1, wherein the control apparatus is responsive to a determination that tape speed has dropped to or below a predetermined speed, or in response to the generation of operational instructions to reduce tape speed to or below a predetermined speed.

7. The data transfer apparatus of claim 1, wherein the control apparatus comprises a mechanism directly acted upon by a tape speed responsive mechanical component.

8. The data transfer apparatus of claim 1, the control apparatus comprising data processing apparatus and a processor-readable medium bearing processor-readable instructions, wherein the instructions, when executed by data processing apparatus of a tape data transfer apparatus, cause the data processing apparatus to determine if tape speed has dropped to or below a predetermined speed and, in response to a determination that tape speed has dropped to or below a predetermined speed, cause the data processing apparatus to output a signal to initiate movement of a tape out of surface to surface contact with a tape transducer head.

9. The data transfer apparatus of claim 1, wherein the relative movement between the tape lifter and the tape is effected by movement of the tape lifter.

10. The data transfer apparatus of claim 1, wherein the transducer head is stationary and the tape lifter moves independent of the transducer head to move the tape away from the transducer head.

11. The data transfer apparatus of claim 1, further comprising at least one sensor to determine the tape speed.

12. The data transfer apparatus of claim 11, wherein the at least one sensor is a Hall effect sensor.

13. The data transfer apparatus of claim 1, wherein if the controller apparatus determines that tape speed is dropping and has moved below a predetermined speed, the controller apparatus initiating movement of the tape lifter towards the tape.

14. The data transfer apparatus of claim 13, wherein further comprising the controller apparatus operating with latency to complete movement of the tape lifter into an actuated position.

15. A processor-readable non-transitory medium bearing processor-readable instructions, wherein the instructions, when executed by data processing apparatus of a tape data transfer apparatus, cause the processor, in response to a tape speed related condition or event, to cause relative movement between the tape lifter and the tape into mutual contact such that the tape lifter moves the tape, thereby biasing the tape away from surface to surface contact with the transducer head.

16. The processor-readable medium of claim 15, wherein the instructions, when executed by the processor, cause the data processing apparatus to determine if tape speed has dropped to or below a predetermined speed and, in response to a determination that tape speed has dropped to or below a predetermined speed, cause the data processing apparatus to output a signal to initiate movement of a tape lifter to lift a tape out of surface to surface contact with a tape transducer head.

17. A method of reducing stiction in a tape drive comprising a transducer head, the method comprising, responsive to a tape speed related condition or event, causing relative movement between the tape lifter and the tape into mutual contact such that the tape lifter moves the tape, thereby biasing the tape away from surface to surface contact with the transducer head.

18. The method of claim 17, comprising determining if a speed of the tape has dropped to or below a predetermined speed, and in response to a determination that the tape speed has dropped to or below the predetermined speed, moving the tape lifter to lift the tape away from surface to surface contact with the transducer head.

19. The method of claim 17, wherein the tape speed related condition or event comprises the generation of operational instructions to reduce tape speed to or below a predetermined speed.

20. The method of claim 17, comprising lifting the tape away from surface to surface contact from a location along the tape path disposed to one side of a contact region of the transducer head and tape path, whereby the tape is lifted out of surface to surface contact with the transducer head only in a sub-region of the contact region.

* * * * *